(12) United States Patent
Deboy et al.

(10) Patent No.: US 12,051,977 B2
(45) Date of Patent: Jul. 30, 2024

(54) MULTI-LEVEL POWER CONVERTER AND CONTROL

(71) Applicant: Infineon Technologies Austria AG, Villach (AT)

(72) Inventors: Gerald Deboy, Klagenfurt (AT); Matthias J. Kasper, Villach (AT)

(73) Assignee: Infineon Technologies Austria AG, Villach (AT)

( * ) Notice: Subject to any disclaimer, the term of this patent is extended or adjusted under 35 U.S.C. 154(b) by 143 days.

(21) Appl. No.: 17/527,482

(22) Filed: Nov. 16, 2021

(65) Prior Publication Data
US 2023/0155508 A1 May 18, 2023

(51) Int. Cl.
*H02M 3/158* (2006.01)
*H02M 1/00* (2006.01)
*H02M 1/14* (2006.01)

(52) U.S. Cl.
CPC ....... *H02M 3/1584* (2013.01); *H02M 1/0048* (2021.05); *H02M 1/14* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155;
(Continued)

(56) References Cited

U.S. PATENT DOCUMENTS 7,239,113 B2 * 7/2007 Johnson ............ H02M 7/53875
290/40 C
10,270,330 B2 * 4/2019 Engelhardt ........... H02M 3/157
(Continued)

OTHER PUBLICATIONS

Costa Levy Ferreira, et al: "Multilevel Buck/Boost-Type DC-DC Converter for High-Power and High-Voltage Application", IEEE Transactions On Industry Applications, IEEE Service Center, Piscataway, NJ, US, vol. 50, No. 6, Nov. 1, 2014 (Nov. 1, 2014), pp. 3931-3942, XP011564589.
(Continued)

*Primary Examiner* — Jeffrey A Gblende
(74) *Attorney, Agent, or Firm* — Armis IP Law, LLC

(57) ABSTRACT

An apparatus such as a power supply or other suitable entity includes a controller. The controller receives a target ripple current value indicative of a ripple current associated with an output voltage and corresponding output current of a power converter powering a load. The controller selects a switching frequency of operating the power converter as a function of a magnitude of the received target ripple current value. The controller applies the selected switching frequency to switches in the power converter to produce the output current with a magnitude of the ripple current as indicated by the target ripple current value.

31 Claims, 14 Drawing Sheets

(58) Field of Classification Search
CPC ...... H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0048; H05B 39/048; B23K 11/24; H04B 2215/069
See application file for complete search history.

(56) References Cited

U.S. PATENT DOCUMENTS

| | | | |
|---|---|---|---|
| 10,615,692 B2 * | 4/2020 | Khayat | H02M 3/158 |
| 2012/0268972 A1 * | 10/2012 | Daigo | H02M 7/217 |
| | | | 363/48 |
| 2016/0204702 A1 * | 7/2016 | Padyana | H02M 3/1563 |
| | | | 323/271 |
| 2019/0348901 A1 | 11/2019 | Chen | |
| 2021/0067041 A1 | 3/2021 | Cho et al. | |

OTHER PUBLICATIONS

European Extended Search Report, EP 22 20 7507, Apr. 3, 2023, pp. 1-9.

* cited by examiner

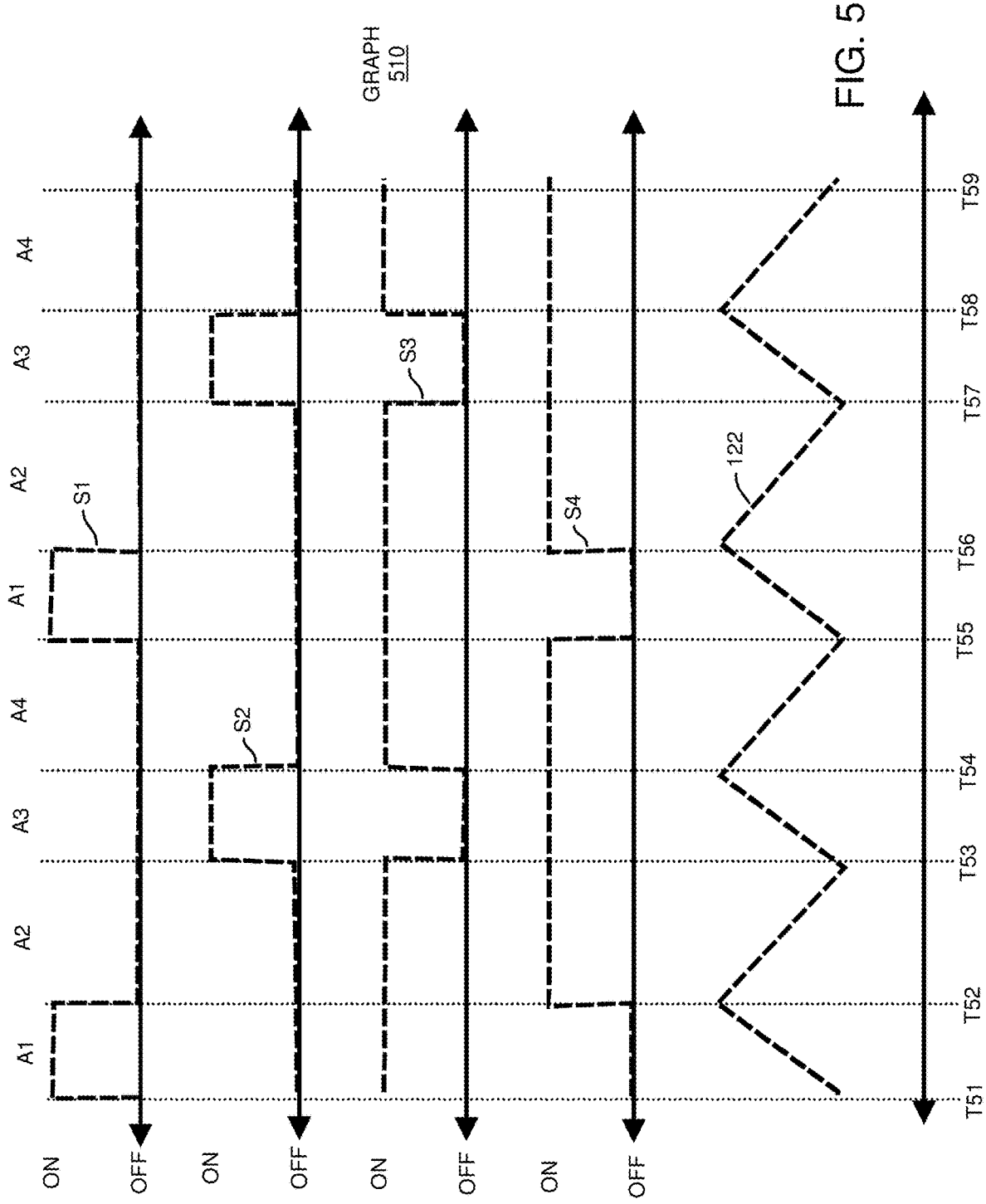

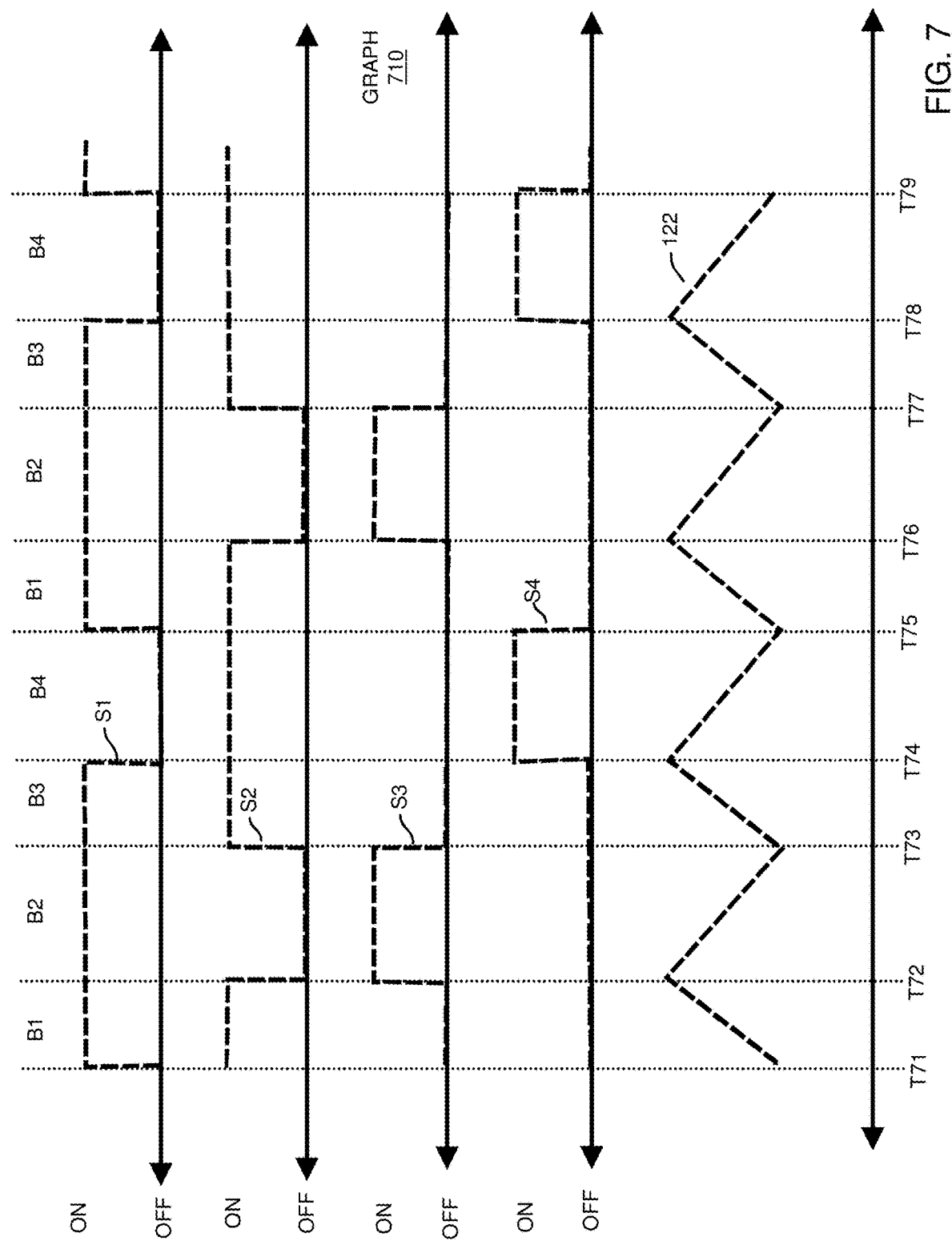

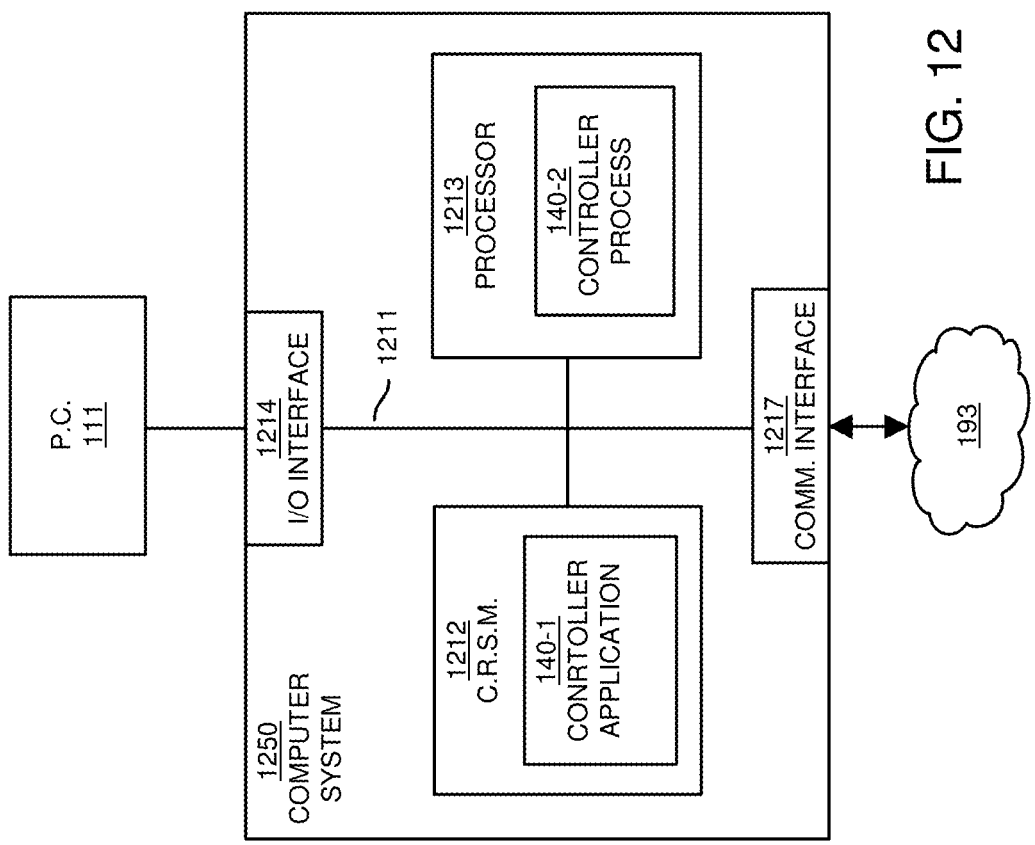

MULTI-LEVEL POWER CONVERTER AND CONTROL

BACKGROUND

Data centers such as operated by Google™, Facebook™, and other entities provide indispensable services for our society. The energy consumption for all data centers worldwide is around 2% of overall electric energy usage. Therefore, datacenter providers are constantly looking to improve the efficiency of power conversion in order to save energy or to be able to increase the CPU/GPU/ASIC, etc., power of servers in existing data centers. Machine learning and artificial intelligent architectures require very powerful GPUs or custom designed ASICs to meet the required calculation power.

Higher voltage distribution and efficient conversion systems are necessary to reduce losses and increase the overall power density of the conversion system. In the last few years, 48V DC at the rack level has been introduced by vendors enabling several different scenarios to provide high power to digital load, such as CPU/ASIC/GPU. These architectures are coordinated, e.g., by the Open compute consortium, currently OCP 3.0 is the most modern architecture supporting 48V DC distribution within the rack.

One type of power supply to convert an input voltage into an output voltage is a so-called a multi-level buck converter. A 3-level buck converter is a versatile topology to convert and regulate power from a higher input to a lower output voltage. Due to the intrinsic nature of the converter, it works specifically well at an input voltage to output voltage ratio of 2:1.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator. Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

This disclosure further includes the observation that power conversion efficiency of conventional power supplies can be improved. For example, to this end, embodiments herein include novel ways of providing improved performance of power conversion via implementation of novel control techniques.

More specifically, the novel power supply as described herein includes a controller. The controller receives a target ripple current value indicative of a ripple current associated with an output current of a power converter powering a load. In one embodiment, the output current of the power converter includes a DC output current component and an AC output current component (such as the ripple current). When generating the output voltage and corresponding output current of the power converter, the controller selects a switching frequency of operating the power converter as a function of a magnitude of the received target ripple current value. The controller then applies the selected switching frequency to switches in the power converter to produce the output current with a magnitude of the ripple current as indicated by the target ripple current value.

In further example embodiments, the power converter produces the output current (and corresponding output voltage) based on a received input voltage. In one embodiment, the target ripple current value is a constant ripple current value assigned to or associated with different magnitudes of the input voltage. In such an embodiment, the controller varies a magnitude of the switching frequency applied to the switches such that the ripple current associated with the output current of the power converter is equal to the constant ripple current value for the different magnitudes of the input voltage. Thus, in one embodiment, although a magnitude of the input voltage drops over time, the magnitude of the ripple current is constant or least controlled to a desired value as a function of the magnitude of the input voltage and/or one or more other parameters associated with the power supply.

In still further example embodiments, the magnitude of the target ripple current value varies based at least in part on a magnitude of an input voltage converted by the power converter into the output current. Thus, in one embodiment, as the magnitude of the input voltage supplied to the power converter changes over time, the controller adjusts the switching frequency applied to switches in the power converter. The magnitude of the ripple current of the output current varies depending on a magnitude of the input voltage and potentially one or more other parameters as discussed herein.

Further embodiments herein include, via the controller or other suitable entity, deriving the selected switching frequency in which to apply to the multi-level power converter and produce the output current based on the target ripple current value and a magnitude of an input voltage converted by the power converter into the output current.

In still further example embodiments, the output current supplied by the power converter to the load (dynamic or static) includes a DC current component and an AC peak-to-peak current component. In one embodiment, the ripple current as discussed herein represents the AC peak-to-peak current component.

The magnitude of the AC peak-to-peak current component can be any suitable value. In one embodiment, the magnitude of the AC peak-to-peak current component is less than 50% of a magnitude of the DC current component.

In yet further example embodiments, the controller or other suitable entity selects the switching frequency of operating the power converter to produce the output current based on the magnitude of the received target ripple current value and an inductance of the power converter.

In still further nonlimiting example embodiments, the power converter is a multi-level buck converter having more than 2 levels. The inductance of the power converter provides a way to store and/or control delivery of current during respective one or more switching cycles.

In further example embodiments, the magnitude of the ripple current value is selected based at least in part to reduce switching losses associated with the power converter.

As previously discussed, the controller can be configured to apply a varying switching frequency to the power converter depending on one or more parameters such as a magnitude of the input voltage, magnitude of the output voltage, magnitude of the output current, inductance of the power converter, number of voltage levels supported by the power converter, output voltage, input voltage, switching losses of the power converter, desired ripple current associated with the produced output current, etc.

Further embodiments herein include, via the controller, preventing the switching frequency applied to the power converter from dropping below a threshold level while generating the output current over a range of different magnitudes of the input voltage.

As previously discussed, power converter can be configured to convert an input voltage into the output voltage and corresponding output current supplied to the dynamic load. In further example embodiments, the controller switches between operating the power converter in a first mode and a second mode. For example, during conditions in which the magnitude of the input voltage is above a threshold level, the controller operates the power converter in a first mode of switching between use of a first voltage level and a second voltage level to produce the output current. During conditions in which the magnitude of the input voltage is below the threshold level, the controller operates in a second of switching between the second voltage level and a third voltage level to produce the output voltage and corresponding output current.

In still further example embodiments, the controller produces a first modulation index value, namely m_real, based on: i) a magnitude of the output voltage, and ii) a magnitude of an input voltage converted by the power converter into the output current; as previously discussed, the controller or other suitable entity derives the switching frequency based on the first modulation index value.

In still further example embodiments, the first modulation index value, m_real, equals Vout/Vin, where Vout is a magnitude of the output voltage of the power converter supplying the output current to the load, where Vin is a magnitude of the input voltage. The controller produces a second modulation index value, m_eff, equal to m_real MODULO (1/N_cells), where N_cells=n_levels−1, where the value n_levels equals a number of different voltages supported by the power converter to produce the output voltage; wherein the switching frequency is f_sw; and wherein:

$$f\_sw = Vin/(\Delta i \cdot L) \cdot m\_eff \cdot (1/N\_cells - m\_eff),$$

where $\Delta i$ = the target ripple current value, and
where L = a magnitude of an inductance implemented in the power converter to convert the input voltage into the output current.

In further example embodiments, the power supply as discussed herein includes a power converter having a multi-level converter structure. The number of levels is equal to or greater than 3; the power converter operates in at least one operation range of input to output voltage ratios with a variable switching frequency. In one embodiment, the variable frequency depends on one or more parameters such as a ratio of input voltage to output voltage. The controller as discussed herein adjusts the switching frequency in order to keep the ripple current of the output current constant or some target value as previously discussed.

In still further example embodiments, the target ripple current value may be a function of an efficiency of the power converter as well as one or more other parameters such as input voltage. In such an instance, the controller as discussed herein monitors a magnitude of the input voltage and the one or more operational settings of the power converter (such as DC output voltage setpoint, magnitude of DC output current, etc.) to determine an appropriate switching frequency in which to generate the output voltage and corresponding output current from the power converter.

Note that embodiments herein are useful over conventional techniques. For example, in contrast to conventional techniques, the novel controller as described herein provides unique control of generating an output voltage and corresponding output current.

These and other more specific embodiments are disclosed in more detail below.

Note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment herein includes a computer readable storage medium and/or system having instructions stored thereon to facilitate generation of an output voltage to power a load. The instructions, when executed by computer processor hardware, cause the computer processor hardware (such as one or more co-located or disparately located processor devices or hardware) to: receive a target ripple current value indicative of a ripple current associated with an output current of a power converter powering a load; select a switching frequency of operating the power converter as a function of a magnitude of the received target ripple current value; and apply the selected switching frequency to switches in the power converter to produce the output current with the ripple current as indicated by the target ripple current value.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling operation of a power supply including one or more regulated power converter stages and one or more switched-capacitor converters, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 5 is an example diagram illustrating control of a power converter and generation of an output current according to embodiments herein.

FIG. 7 is an example diagram illustrating control of a power converter and generation of an output current according to embodiments herein.

FIG. 12 is an example diagram illustrating computer architecture operable to execute one or more operations according to embodiments herein.

Figure 1:
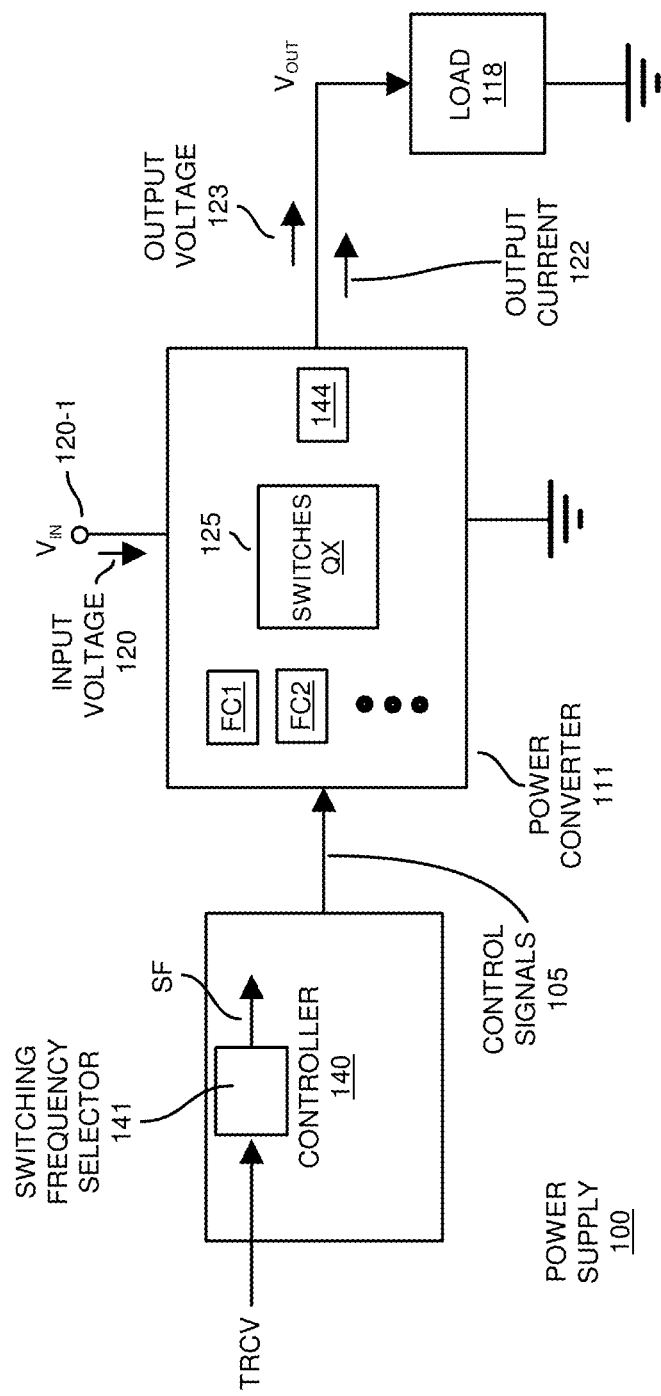
FIG. 1 is an example diagram illustrating a power converter controller including a switching frequency selector and one or more flying capacitors according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, embodiments herein are useful over conventional techniques. For example, in contrast to conventional techniques, the novel power supply as described herein includes a controller. The controller regulates generation of an output signal from the power converter based on a target ripple current value. For example, the controller receives a target ripple current value indicative of a ripple current associated with an output voltage and corresponding output current of a power converter powering a load. In one embodiment, the output current of the power converter includes a DC output current component and an AC output current component (such as the ripple current). When generating the output current of the power converter, the controller selects a switching frequency of operating the power converter as a function of a magnitude of the received target ripple current value (AC output current component). The controller then applies the selected switching frequency to switches in the power converter to produce the output current with a magnitude of the ripple current as indicated by the target ripple current value.

Now, more specifically, FIG. 1 is an example diagram illustrating a power converter including a switching frequency selector and one or more flying capacitors according to embodiments herein.

As shown in this example embodiment, power supply 100 includes a controller 140, power converter 111 (a.k.a., voltage converter), and load 118.

In one embodiment, each of the components in power supply 100 represents an entity such as an apparatus, electronic device, electronic circuitry, etc., although they can be implemented in any suitable manner.

The controller 140 and corresponding switching frequency selector 141 can be instantiated as or include hardware (such as circuitry), software (executable instructions), or a combination of hardware and software resources where applicable. In other words, the controller 140 can be implemented as controller hardware, controller software, or a combination of controller hardware and controller software.

In accordance with further example embodiments, the power converter 111 includes one or more flying capacitors such as flying capacitor FC1, flying capacitor FC2, etc. The power converter 111 further includes a network of switches 125 (such as including one or more switches Qx), and inductor 144.

During operation, via control signals 105 controlling switches 125, the controller 140 controls conveyance of energy from the input voltage 120 and the one or more flying capacitors (such as FC1, FC2, etc.) to the inductor 144. The flying capacitors are charged and discharged from one or more reference voltages such as input voltage 121 (as received from the input voltage source 120-1), ground, etc., via switching of the network of switches 125 controlled by controller 140. The inductor 144 converts the received energy from the input voltage 121 and flying capacitors FC1, FC2, etc., into an output voltage 123 and corresponding output current 122 to power the dynamic load 118.

In further example embodiments, the controller 140 receives a target ripple current value TRCV indicative of a ripple current associated with generation of the output current 122. As previously discussed, in one embodiment, the output current 122 of the power converter includes a DC output current component and an AC output current component. (such as the ripple current as previously mentioned). The AC output current component can take any suitable from such as SINE wave, sawtooth wave, etc.

When generating the output current 122 of the power converter 111, the controller 140 selects a switching frequency SF of operating the power converter 111 and corresponding switches 125 (a.k.a., Qx) as a function of a magnitude of the received target ripple current value TRCV. The controller 140 then applies the selected (appropriate) switching frequency SF to switches 125 in the power converter 111 to produce the output current 122 with a magnitude of the ripple current (AC component) as indicated by the target ripple current value TRCV.

Figure 2:
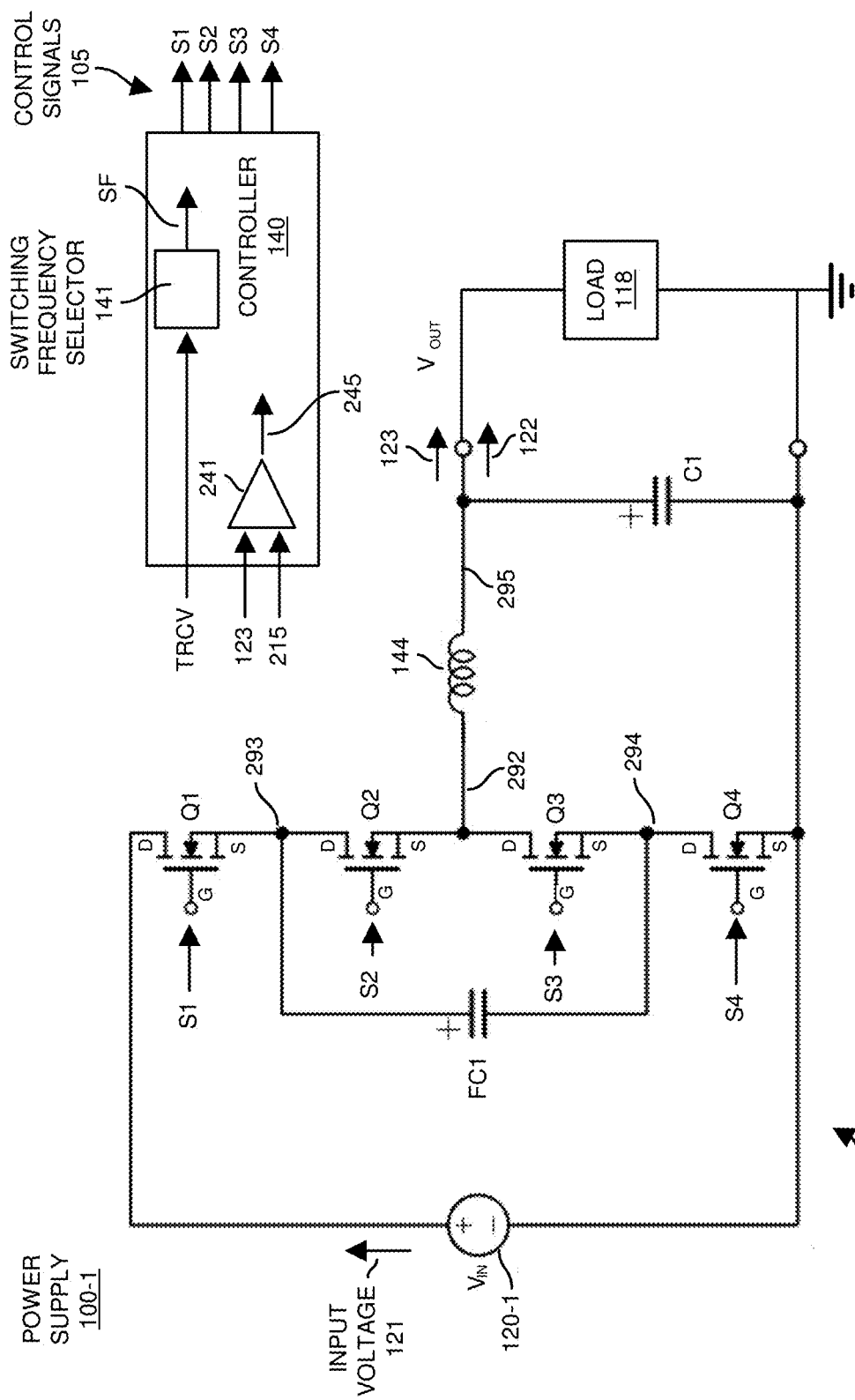
FIG. 2 is an example detailed diagram illustrating an example controller and multi-level power converter according to embodiments herein.

FIG. 2 is an example detailed diagram illustrating an example controller and multi-level power converter according to embodiments herein.

In this example embodiment, the power converter 111-1 is implemented as multi-level power converter and includes input voltage source 120-1, multiple switches Q1, Q2, Q3, and Q4, flying capacitor FC1, inductor 144, and output capacitor C1.

In one embodiment, the switches 125 (such as Q1, Q2, Q3, and Q4) are implemented as field effect transistors. However, note that the switches Q1, Q2, Q3, and Q4 can be implemented via any suitable type of resource.

Further in this example embodiment, the multiple switches Q1, Q2, Q3, and Q4 are connected in series between the input reference voltage and the ground reference. For example, the drain node (D) of switch Q1 is connected to the input voltage source node 120-1 (such as a battery, voltage supplied by another power supply, etc.); the source node (S) of switch Q1 is connected to the drain node (D) of switch Q2 (a.k.a., node 293); the source node (S) of switch Q2 is connected to the drain node (D) of switch Q3 and node 292 of the inductor 144; the source node (S) of switch Q3 is connected to the drain node (D) of switch Q4; the source node (S) of switch Q4 is connected to ground.

This example instance of the multi-level power converter 111-1 includes a flying capacitor FC1. The flying capacitor FC1 is connected in parallel with the series combination of switches Q2 and Q3. More specifically, a first node of the flying capacitor FC1 is connected to the node 293; a second node of the flying capacitor FC1 is connected to the node 294.

Further in this example embodiment, the control signals 105 include control signal S1, control signal S2, control signal S3, and control signal S4.

As shown, the control signal S1 is applied the gate node of the switch Q1 to control its operation; the control signal S2 is applied the gate node of the switch Q2 to control its operation; the control signal S3 is applied the gate node of the switch Q3 to control its operation; the control signal S4 is applied the gate node of the switch Q4 to control its operation.

In still further example embodiments, the controller 140 can be configured to regulate a magnitude of the output voltage 123 (Vout) from the power converter 111-1 to power the dynamic load 118.

For example, in one embodiment, the power converter 111-1 receives a setpoint reference voltage 215 (such as 24 VDC or other suitable value) indicating a magnitude at which to produce the output voltage 123. During generation of the output voltage 123 and corresponding output current 122, the controller 140 implements the comparator 241 to produce an error voltage 245 indicating a difference between the magnitude of the output voltage 123 and the setpoint reference voltage 215. The controller 140 varies a duty cycle of the control signals 105 (namely, control signal S1, control signal S2, control signal S3, and control signal S4) such that a DC component of the output voltage 123 is substantially equal to the setpoint reference voltage 215.

Thus, switches Q1-Q4 are controlled to convert the input voltage 121 into an output current 122. The controller 140 controls a switching frequency SF of control signals 105 applied to the switches Q1, Q2, Q3, and Q4 such that the AC (ripple) current associated with the output current 122 substantially matches (such as in 10%, 20%, or any suitable amount, etc.) a respective target ripple current value TRCV. Thus, the controller 140 as discussed herein simultaneously implements multiple types of control when producing the output voltage 123 and corresponding output current 122.

For example, the controller 140 varies a duty cycle of controlling respective switches 125 (Q1, Q2, Q3, and Q4) in a similar manner as previously discussed to maintain a magnitude of the output voltage 123 at a desired level. Additionally, the controller 140 selects an appropriate switching frequency SF such that the ripple current of output current 122 is approximately equal to the target reference current value TRCV.

Figure 3:
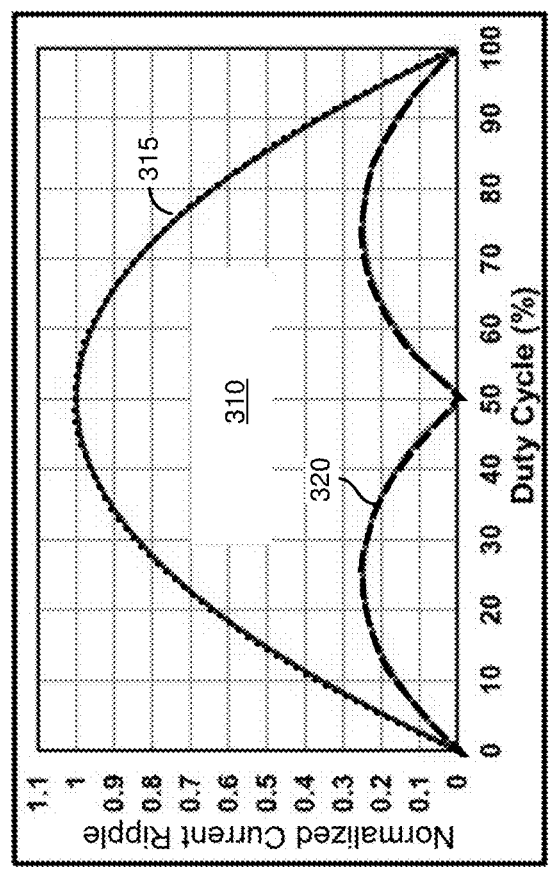
FIG. 3 is an example graph illustrating duty cycle versus ripple current according to embodiments herein.

FIG. 3 is an example graph illustrating duty cycle versus ripple current according to embodiments herein.

Graph 315 of FIG. 3 illustrates a magnitude of ripple current versus duty cycle when implementing the power converter 111 as discussed herein. For example, the curve 315 illustrates a normalized magnitude of the ripple current with respect to the duty cycle for a standard buck converter. On the other hand, the curve 320 in graph 310 indicates a magnitude of the ripple current associated with the output current 122 via implementation of a multi-level power converter 111 (3 voltage levels 0, Vin/2, and Vin). As shown in graph 310, when controlling the switches 125 in the power converter 111 with a 50% duty cycle control signals 105, the ripple current is substantially zero.

In one embodiment, the voltage source 120-1 is a battery; a magnitude of the input voltage 121 decays over time. The power converter 111 is suitable for power conversion from, e.g., a battery ranging from a voltage of 60 VDC gradually degrading to 40 VDC. The 3-level buck power converter 111 in FIG. 2 provides a regulated 24 VDC bus output voltage 123, which is subsequently transferred into 12V by a capacitive divider such as a switch tank converter. Buck converters typically operate at a constant switching frequency, where the switching frequency is limited by the amount of switching losses.

Embodiments herein include producing a non-zero ripple current (such as indicated by the setpoint target ripple current value TRCV) on the output current 122 while also regulating a magnitude of a DC voltage component of the corresponding output voltage 123 to a desired setpoint reference voltage.

Figure 4:
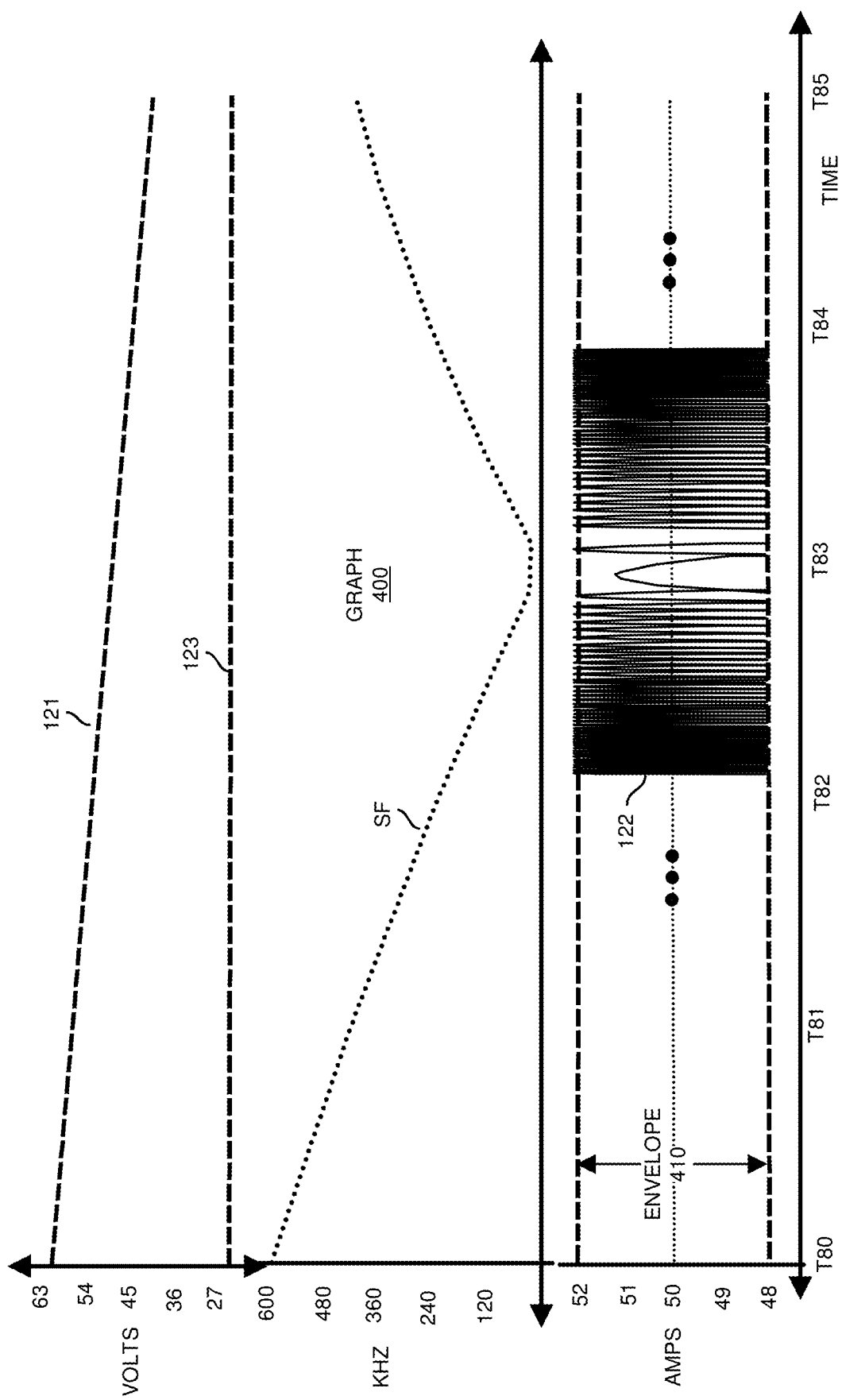
FIG. 4 is an example graph diagram illustrating variation of a switching frequency applied to a multi-level power converter to provide a constant output ripple current as a magnitude of an input voltage decays over time according to embodiments herein.

FIG. 4 is an example graph diagram illustrating variable control of a switching frequency under ideal conditions to provide a constant output ripple current as a magnitude of an input voltage decays over time according to embodiments herein.

Graph 400 illustrates operation of the power converter 111 over time based on a variable input voltage 121. For example, assume that the controller 140 receives a target DC voltage value of 24 VDC as the setpoint reference voltage 215. Additionally, assume that the controller 140 receives a target ripple current voltage setting of TRCV=4 Amperes AC.

At time T80, the input voltage 121 such as received from a battery or other suitable entity (source 120-1) starts at a magnitude of around 60 VDC. A magnitude of the input voltage 121 decreases over time as the energy in the battery is depleted from time T80 to time T85. In a manner as previously discussed, the controller 140 regulates a magnitude of the output voltage 123 to be 24 VDC.

Additionally, over a range of different magnitudes of the input voltage 121, the controller 140 implements switching frequency selector 141 to apply an appropriate switching frequency SF to switches 125 in the power converter 111 such that the magnitude of the ripple current associated with the output current 122 is equal to the target ripple current value TRCV=4 Amps for the range of different magnitudes of the input voltage 121. More specifically, see envelope 410 indicating a range of the ripple current associated with the generated output current 122 over a range of different magnitudes of the input voltage 121. In this example embodiment, the envelope 410 indicates that the ripple current of the output current is substantially constant.

Note further that the graph 400 also illustrates that the switching frequency selector 141 and controller 140 reduce a magnitude of the switching frequency SF between time T80 and T83 to accommodate the change in the input voltage 121. As previously discussed, control of the switching frequency SF results in a substantially constant ripple current of around 4 amperes. Assume in this example embodiment that the dynamic load 118 consumes around 50 DC amperes at an output voltage of 24 VDC. In such an instance, the average output current 122 is 50 AMPS including the 4 AMP ripple current component.

Thus, between time T80 and T83, the controller 140 and corresponding switching frequency selector 141 reduce a magnitude of the switching frequency SF, in which a duty cycle of operating switches is less than 50%. At or around time T83, the operation of the power converter 111 reaches an inflection point. After time T83, because the input voltage 121 is below a threshold level of around 48 VDC, the controller 140 and corresponding switching frequency selector 141 increase a magnitude of the switching frequency SF, in which a duty cycle of operating switches is greater than 50%. Examples are shown in FIGS. 5-8.

Referring again to FIG. 4, in still further example embodiments, to maintain a magnitude of the ripple current to around the target value of 4 Amperes, note that the controller 140 can be configured to produce a first modulation index value, namely m_real, based on: i) a magnitude of the output voltage 123, and ii) a magnitude of an input voltage 121 converted by the power converter 111 into the output current 122. As further discussed below, the controller 140 or other suitable entity derives the switching frequency SF based on the first modulation index value.

In one embodiment, the first modulation index value, $$m\_real = Vout/Vin, \quad \text{(equation 1)}$$

where Vout is a magnitude of an output voltage 123 of the power converter 111 supplying the output current 122 to the load 118, where Vin is a magnitude of the input voltage 121.

The switching frequency selector 141 and controller 140 produce a second modulation index value, $$m\_eff = m\_real \times MODULO \times (1/N\_cells), \quad \text{(equation 2)}$$

$$\text{where } N\_cells = n\_levels - 1, \quad \text{(equation 3)}$$

where n_levels equals a number of different voltages (such as 3 levels for the power converter 111 in FIG. 2, in which N_cells=2) supported by the power converter 111 to produce the output voltage 123; wherein the switching frequency is f_sw (a.k.a., switching frequency SF signal); and wherein:

$$f\_sw = Vin/(\Delta i \cdot L) \cdot m\_eff \cdot (1/N\_cells - m\_eff),$$

where Δi=the target ripple current value TRCV=4 amperes, and where L=a magnitude of an inductance (inductor 144 such as 2 microhenries or other suitable value) implemented in the power converter 111 to convert the input voltage 121 into the output current 122.

FIG. 5 is an example diagram illustrating control of a power converter and generation of an output current according to embodiments herein. FIGS. 6A, 6B, 6C, and 6D illustrate different control modes of operating a multi-level power converter via control signals in FIG. 5 according to embodiments herein. The following description references related FIGS. 5, 6A, 6B, 6C, and 6D.

When a magnitude of the input voltage 121 is greater than twice the magnitude of the output voltage setpoint value (such as 24 VDC), the controller 140 generates the control signals 105 in a manner as shown in graph 510 of FIG. 5. For example, the controller 140 implements multiple control phases or modes A1, A2, A3, and A4 to produce the output voltage 123 and corresponding output current 122 via control signals having a duty cycle of less than 50% (FIGS. 5, 6A, 6B, 6C, and 6D) because the magnitude of the input voltage 121 is greater twice the output voltage setpoint of 24 VDC.

Figure 6B:
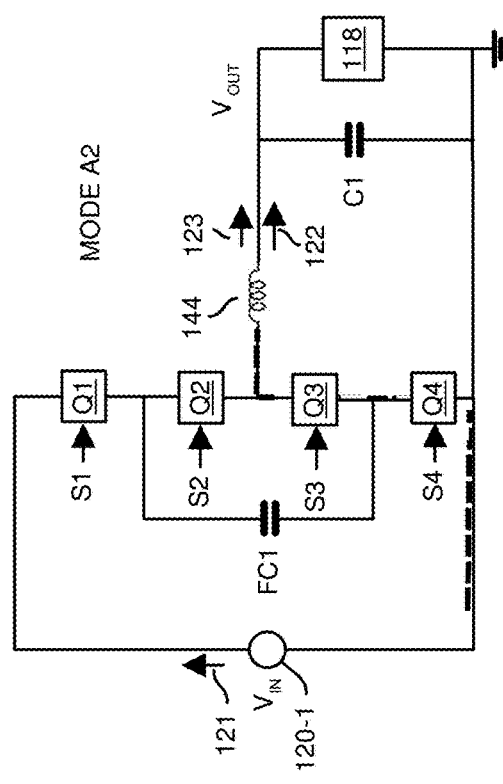
FIGS. 6A, 6B, 6C, and 6D illustrate different control modes of operating a multi-level power converter via control signals in FIG. 5 according to embodiments herein.
Figure 6D:
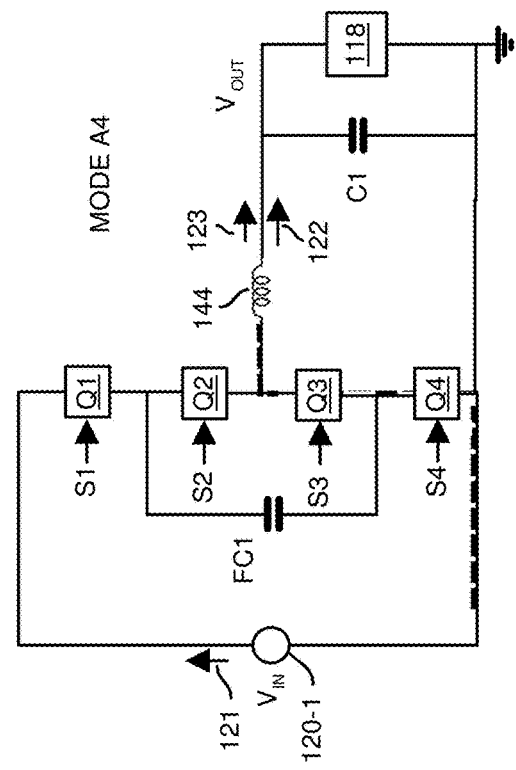
Figure 6A:
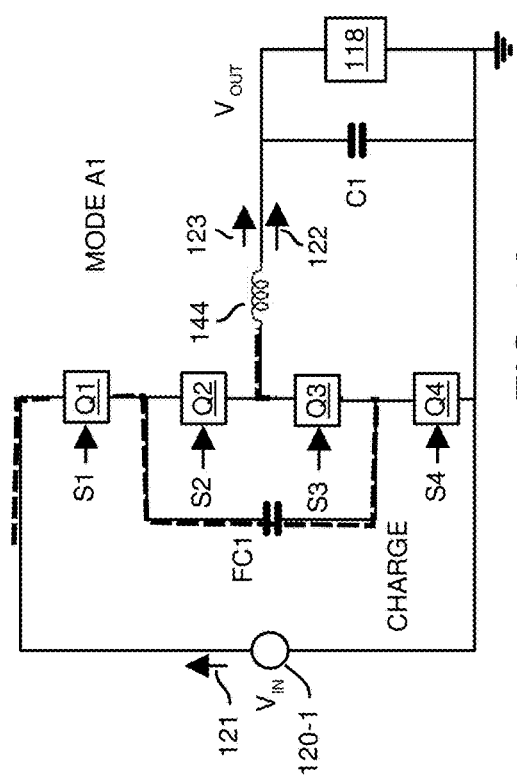

As shown in FIG. 5, during mode A1, between time T51 and T52, the controller 140 activates switches Q1 and Q3 to an ON state and switches Q2 and Q4 to an OFF state. As shown in FIG. 6A, operation of mode A1 causes current to flow from the input voltage source 120-1 through a circuit path including the switch Q1, flying capacitor FC1, switch Q3, and the inductor 144 to produce the output voltage 123 and corresponding output current 122. Thus, mode A1 includes charging of the flying capacitor FC1.

As shown in FIG. 5, during mode A2, between time T52 and T53, the controller 140 activates switches Q3 and Q4 to an ON state and switches Q1 and Q2 to an OFF state. As shown in FIG. 6B, operation of mode A2 causes current to flow from the ground reference through a circuit path including the switch Q4, switch Q3, and the inductor 144 to produce the output voltage 123 and corresponding output current 122. Thus, mode A2 includes coupling the inductor 144 to ground.

Figure 6C:
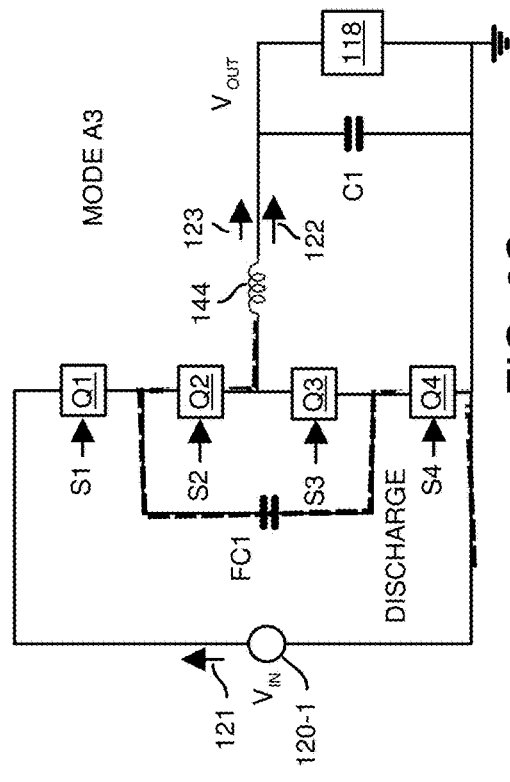

As shown in FIG. 5, during mode A3, between time T53 and T54, the controller 140 activates switches Q2 and Q4 to an ON state and switches Q1 and Q3 to an OFF state. As shown in FIG. 6C, operation of mode A3 causes current to flow from the ground reference through a circuit path including the switch Q4, flying capacitor FC1, switch Q2, and the inductor 144 to produce the output voltage 123 and corresponding output current 122. Thus, mode A3 includes discharging of the flying capacitor FC1.

As shown in FIG. 5, during mode A4, between time T54 and T55, the controller 140 activates switches Q3 and Q4 to an ON state and switches Q1 and Q2 to an OFF state. As shown in FIG. 6D, operation of mode A4 causes current to flow from the ground reference through a circuit path including the switch Q4, switch Q3, and the inductor 144 to produce the output voltage 123 and corresponding output current 122. Thus, mode A4 includes coupling the inductor 144 to ground.

As further shown in graph 510, the controller 140 repeats this control cycle over time.

As previously discussed, switching of the switches 125 in this manner results in generation of an output current 122 having a desired magnitude of ripple current.

FIG. 7 is an example diagram illustrating control of a power converter and generation of an output current according to embodiments herein. FIGS. 8A, 8B, 8C, and 8D illustrate different control modes of operating a multi-level power converter via control signals in FIG. 7 according to embodiments herein.

When a magnitude of the input voltage 121 is less than twice the magnitude of the output voltage setpoint value (such as 24 VDC), the controller 140 generates the control signals 105 in a manner as shown in graph 710 of FIG. 7. For example, the controller 140 implements multiple control phases or modes B1, B2, B3, and B4 to produce the output voltage 123 and corresponding output current 122 via control signals having a duty cycle of greater than 50% (FIGS. 7, 8A, 8B, 8C, and 8D) because the magnitude of the input voltage 121 is greater twice the output voltage setpoint of 24 VDC.

Figure 8A:
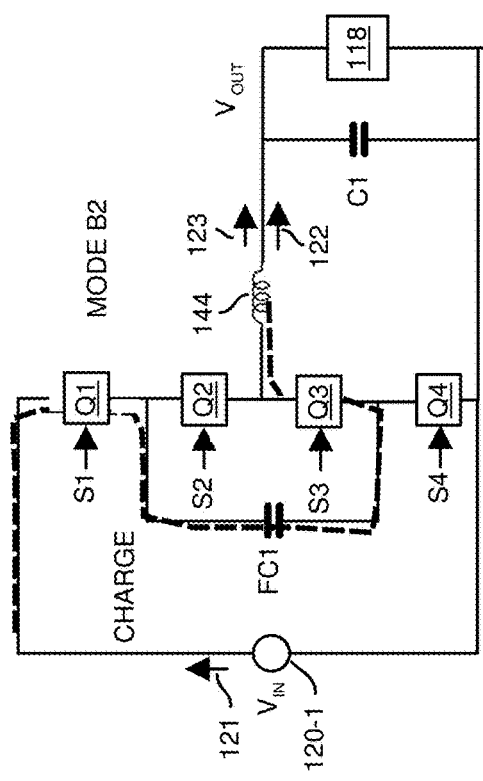
FIGS. 8A, 8B, 8C, and 8D illustrate different control modes of operating a multi-level power converter via control signals in FIG. 5 according to embodiments herein.

As shown in FIG. 7, during mode B1, between time T71 and T72, the controller 140 activates switches Q1 and Q2 to an ON state and switches Q3 and Q4 to an OFF state. As shown in FIG. 8A, operation of mode B1 causes current to flow from the input voltage source 120-1 through a circuit path including the switch Q1, switch Q2, and the inductor 144 to produce the output voltage 123 and corresponding output current 122. Thus, mode B1 includes connecting the inductor 144 to the input voltage source 120-1.

Figure 8B:
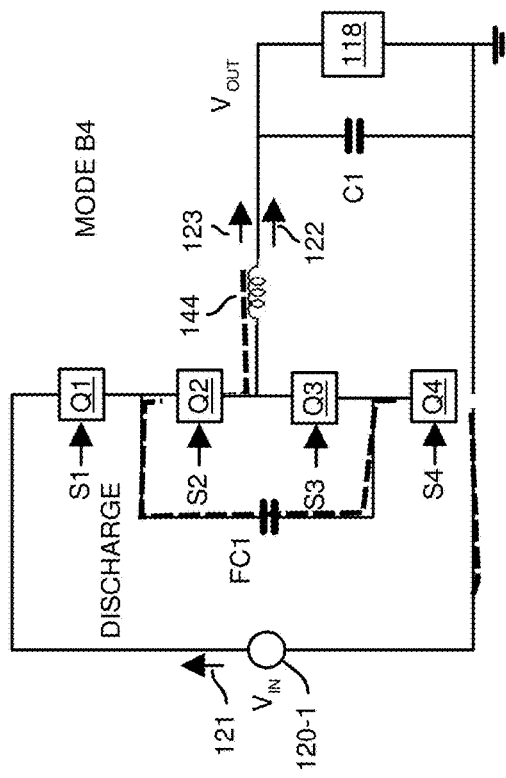

As shown in FIG. 7, during mode B2, between time T72 and T73, the controller 140 activates switches Q1 and Q3 to an ON state and switches Q2 and Q4 to an OFF state. As shown in FIG. 8B, operation of mode B2 causes current to flow from the input voltage source 120-1 through a circuit path including the switch Q1, flying capacitor FC1, switch Q3, and the inductor 144 to produce the output voltage 123 and corresponding output current 122. Thus, mode B2 includes charging the flying capacitor FC1.

Figure 8C:
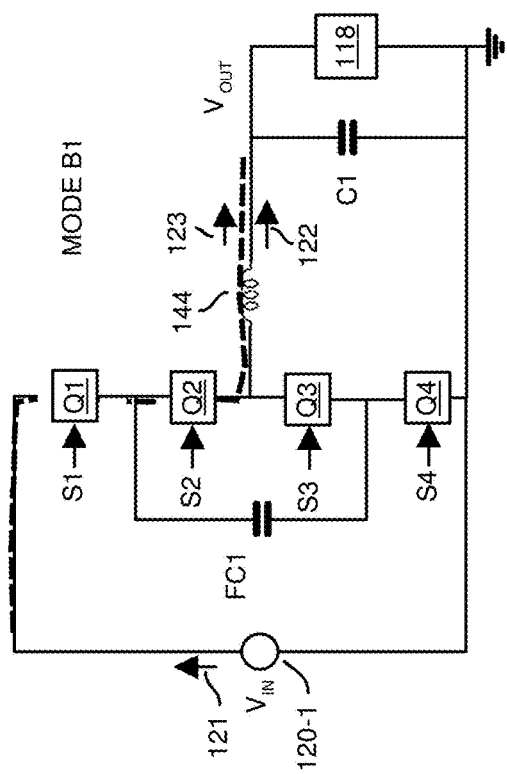

As shown in FIG. 7, during mode B3, between time T73 and T74, the controller 140 activates switches Q1 and Q2 to an ON state and switches Q3 and Q4 to an OFF state. As shown in FIG. 8C, operation of mode B3 causes current to flow from the input voltage source 120-1 through a circuit path including the switch Q1, switch Q2, and the inductor 144 to produce the output voltage 123 and corresponding output current 122. Thus, mode B3 includes connecting the inductor 144 to the input voltage source 120-1.

Figure 8D:
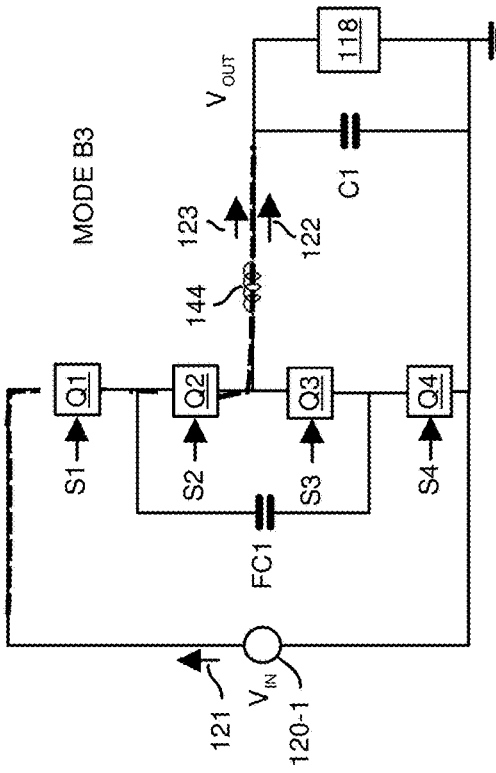

As shown in FIG. 7, during mode B4, between time T74 and T75, the controller 140 activates switches Q2 and Q4 to an ON state and switches Q1 and Q3 to an OFF state. As shown in FIG. 8D, operation of mode B4 causes current to flow from the ground reference through a circuit path including the switch Q4, flying capacitor FC1, switch Q2, and the inductor 144 to produce the output voltage 123 and corresponding output current 122. Thus, mode B4 includes discharging the flying capacitor FC1.

As further shown in graph 710, the controller 140 repeats this control cycle over time.

As previously discussed, switching of the switches 125 in this manner results in generation of an output current 122 having a desired magnitude of ripple current.

Figure 9:
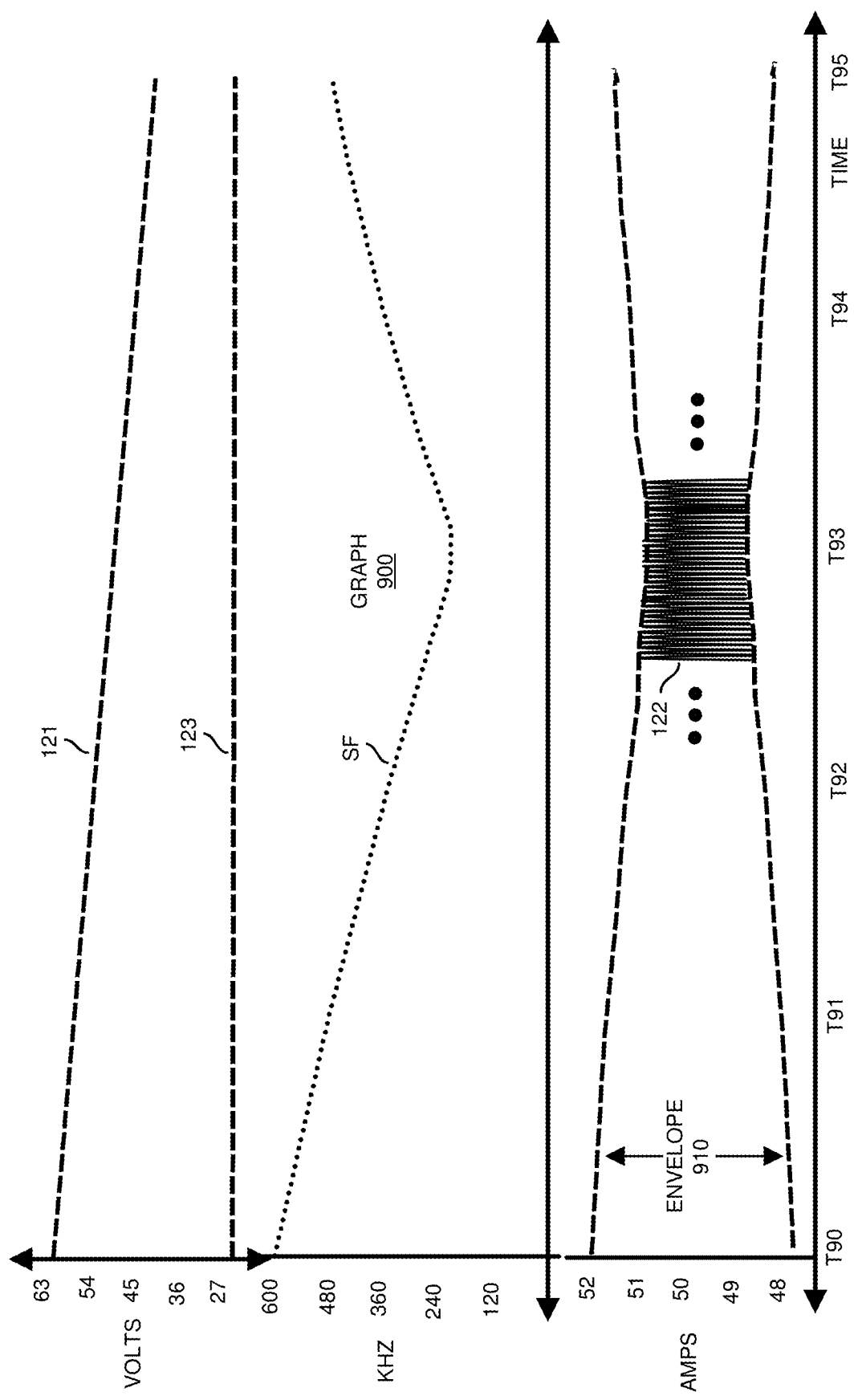
FIG. 9 is an example graph diagram illustrating variation of a magnitude of a switching frequency to provide a target output ripple current as a magnitude of an input voltage varies over time according to embodiments herein.

FIG. 9 is an example graph diagram illustrating variation of switching frequency to provide a target output ripple current as a magnitude of an input voltage varies over time according to embodiments herein.

Graph 900 illustrates operation of the power converter 111 over time based on a variable input voltage 121. For example, assume that the controller 140 receives a target DC voltage value of 24 VDC as the setpoint reference voltage 215. Additionally, assume that the controller 140 receives a variable target ripple current voltage setting of TRCV=2-4 Amperes AC (such as peak to peak ripple).

At time T90, the input voltage 121 such as received from a battery or other suitable entity (source 120-1) starts at a magnitude of around 60 VDC. A magnitude of the input voltage 121 decreases over time as the energy in the battery is depleted from time T90 to time T95. In a manner as previously discussed, the controller 140 regulates a magnitude of the output voltage 123 to be 24 VDC.

Additionally, over a range of different magnitudes of the input voltage 121, the controller 140 implements switching frequency selector 141 to apply an appropriate switching frequency SF to switches 125 in the power converter 111 such that the magnitude of the ripple current associated with the output current 122 is equal to the target ripple current value TRCV as shown by envelope 910 for the different magnitudes of the input voltage 121. More specifically, see envelope 910 indicating a range of the ripple current associated with the generated output current 122 over a range of different magnitudes of the input voltage 121. In this example embodiment, the envelope 910 indicates that the desired magnitude of the ripple current of the output current 122 varies over time such as based on the magnitude of the input voltage 121 or suitable parameters. In this example embodiment, varying a magnitude of the ripple current over time for different magnitudes of the input voltage 121 results in a more efficient conversion (such as lower switching losses) of the input voltage 121 into the output voltage 123 and corresponding output current 122.

Note further that the graph 900 also illustrates that the switching frequency selector 141 and controller 140 reduce a magnitude of the switching frequency SF between time T90 and T93 to accommodate the change in the input voltage 121. As previously discussed, control of the switching frequency SF results in a substantially variable ripple current between approximately 2-4 Amps. Note that embodiments herein include, if desired, implementation of a look-up table to determine an appropriate setting of the switching frequency SF. In other words, in a manner as previously discussed, the switching frequency selector 141 and corresponding controller 140 can be configured to implement equations to determine the appropriate switching frequency to apply to respective switches 125 to achieve a desired ripple current on the output current 122. Alternatively, the controller 140 and corresponding switching frequency selector can be configured to include a look-up table of a predetermined mapping of input voltage (and/or one or more other monitored power supply parameters) to an appropriate switching frequency SF for those power supply conditions.

Assume in this example embodiment that the dynamic load 118 consumes around 50 DC amperes at an output voltage of 24 VDC. In such an instance, the average output current 122 is 50 AMPS including a variable amount of ripple current component.

Thus, between time T90 and T93, the controller 140 and corresponding switching frequency selector 141 reduce a magnitude of the switching frequency SF, in which a duty cycle of operating switches is less than 50%. At or around time T93, the operation of the power converter 111 reaches an inflection point. After time T93, because the input voltage 121 is below a threshold level of around 48 VDC, the controller 140 and corresponding switching frequency selector 141 increase a magnitude of the switching frequency SF, in which a duty cycle of operating switches is greater than 50%. Examples were previously discussed in FIGS. 5-8.

Figure 10:
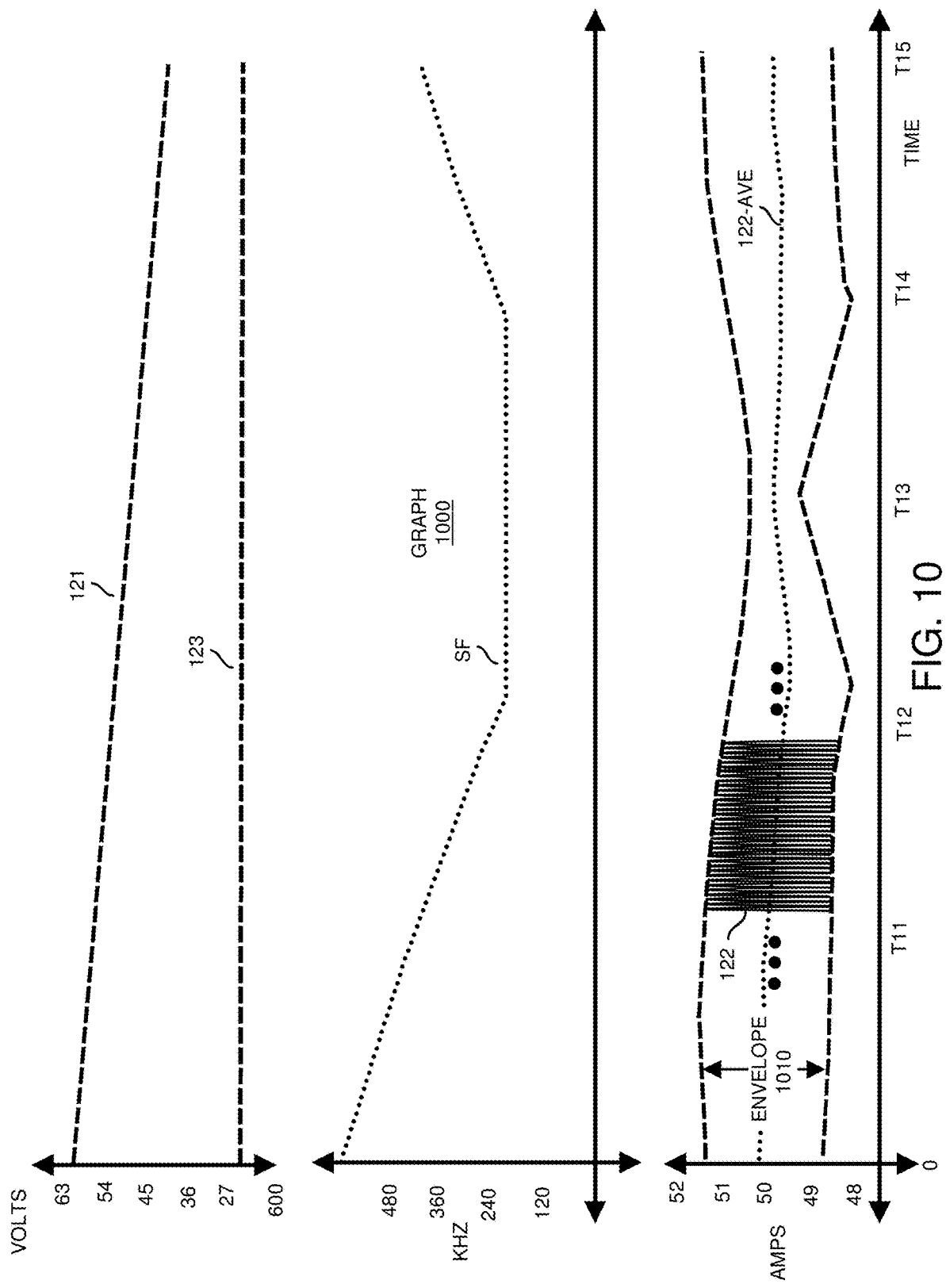
FIG. 10 is an example graph diagram illustrating variation of a magnitude of a switching frequency to provide a target output ripple current as a magnitude of an input voltage varies over time according to embodiments herein.

FIG. 10 is an example graph diagram illustrating variation of switching frequency to provide a target output ripple current as a magnitude of an input voltage varies over time according to embodiments herein.

Graph 1000 illustrates operation of the power converter 111 over time based on a variable input voltage 121. For example, assume that the controller 140 receives a target DC voltage value of 24 VDC as the setpoint reference voltage 215. Additionally, assume that the controller 140 receives a variable target ripple current voltage setting of TRCV=1-4 Amperes AC (such as peak to peak ripple) for different power supply conditions.

At time T10, the input voltage 121 such as received from a battery or other suitable entity (source 120-1) starts at a magnitude of around 60 VDC. A magnitude of the input voltage 121 decreases over time as the energy in the battery is depleted from time T10 to time T15. In a manner as previously discussed, the controller 140 regulates a magnitude of the output voltage 123 to be 24 VDC.

Additionally, over a range of different magnitudes of the input voltage 121, the controller 140 implements switching frequency selector 141 to apply an appropriate switching frequency SF to switches 125 in the power converter 111 such that the magnitude of the ripple current associated with the output current 122 is equal to the target ripple current value TRCV as shown by envelope 1010 for the different magnitudes of the input voltage 121. More specifically, see envelope 1010 indicating a range of the ripple current associated with the generated output current 122 over a range of different power supply conditions such as magnitudes of the input voltage 121. In this example embodiment, the envelope 1010 indicates that the desired magnitude of the ripple current of the output current 122 varies over time such as based on the magnitude of the input voltage 121 or suitable parameters. In this example embodiment, varying a magnitude of the ripple current over time for different magnitudes of the input voltage 121 results in a more efficient conversion (such as lower switching losses) of the input voltage 121 into the output voltage 123 and corresponding output current 122.

Note further that the graph 1000 also illustrates that the switching frequency selector 141 and controller 140 reduce a magnitude of the switching frequency SF between time T10 and T13 to accommodate the change in the input voltage 121. As previously discussed, control of the switching frequency SF results in a substantially variable ripple current between approximately 1-4 Amps. Note that embodiments herein include, if desired, implementation of a look-up table to determine an appropriate setting of the switching frequency SF. In other words, in a manner as previously discussed, the switching frequency selector 141 and corresponding controller 140 can be configured to implement equations to determine the appropriate switching frequency to apply to respective switches 125 to achieve a desired ripple current on the output current 122. Alternatively, the controller 140 and corresponding switching frequency selector 141 can be configured to include a look-up table of a predetermined mapping of input voltage (and/or one or more other monitored power supply parameters) to an appropriate switching frequency SF for those power supply conditions.

Assume in this example embodiment that the dynamic load 118 consumes around 50 DC amperes at an output voltage of 24 VDC. In such an instance, the average output current 122-AVE is 50 AMPS (which may vary somewhat) including a variable amount of ripple current component.

Thus, between time T10 and T13, the controller 140 and corresponding switching frequency selector 141 reduce a magnitude of the switching frequency SF, in which a duty cycle of operating switches is less than 50%. At or around time T13, the operation of the power converter 111 reaches an inflection point. After time T13, because the input voltage 121 is below a threshold level of around 48 VDC, the controller 140 and corresponding switching frequency selector 141 increase a magnitude of the switching frequency SF, in which a duty cycle of operating switches is greater than 50%. Examples were previously discussed in FIGS.

Between about time T12 and T14, the switching frequency SF does not drop below a lower frequency threshold level of around 200 KHz.

Figure 11B:
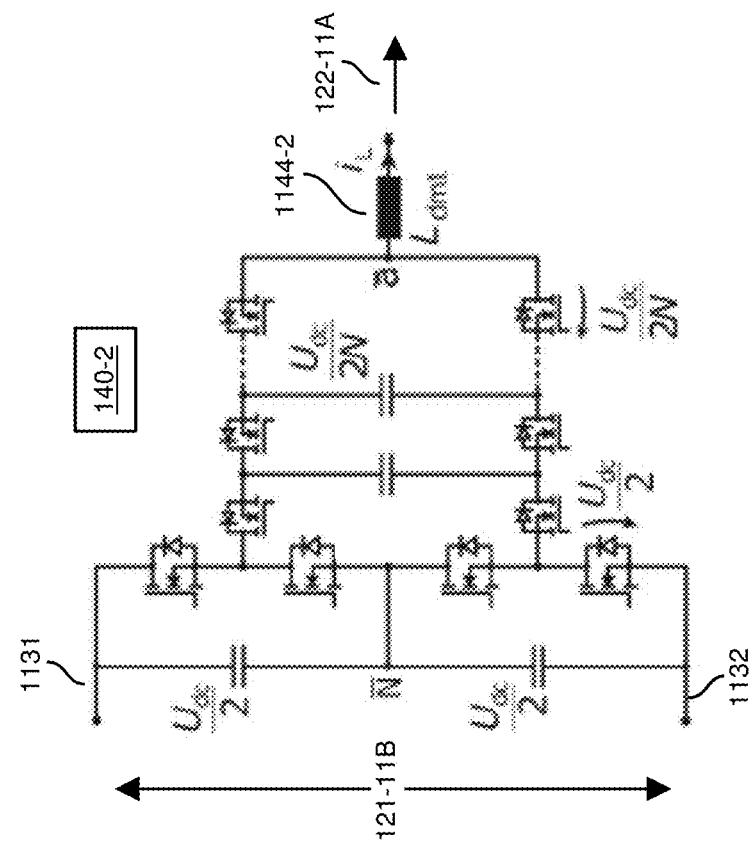
FIGS. 11A and 11B are example diagrams illustrating implementations of a multi-level power converter and application of switching frequency control according to embodiments herein.
Figure 11A:
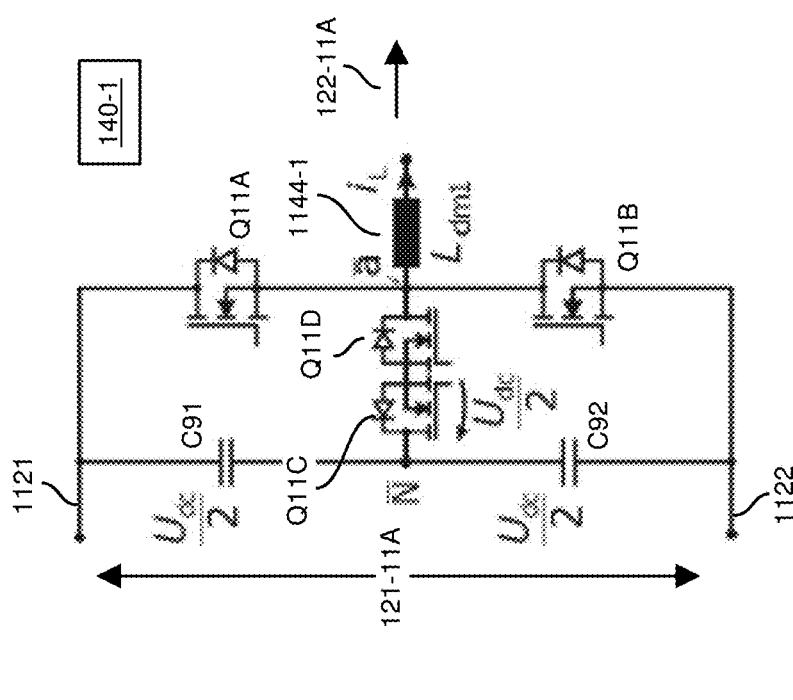

FIG. 11A is an example diagram illustrating a 3-level Bipolar switched Neutral-point-clamp topology controlled according to embodiments herein.

In this example embodiment, the controller 140-1 controls a switching frequency of operating the power converter 111-11A (such as a 3-level Bipolar switched Neutral-point-clamp topology) such that an output current 122-11A of the respective power converter 111-11A is set to a desired ripple current value over a range of different magnitudes of the input voltage 121-11A. In other words, embodiments herein propose a power converter and a corresponding control method where the regulation of the power converter 111-11A is adjusted in such a way that at least in one operation range of input to output voltages the current ripple is constant or varies.

FIG. 11B is an example diagram illustrating a 37-level Hybrid Active Neutral-point clamp topology controlled according to embodiments herein.

In this example embodiment, the controller 140-2 controls a switching frequency of operating the power converter 111-11B (such as a 7-level Hybrid Active Neutral-point clamp topology) such that an output voltage of the respective power converter 111-11B is constant over a range of different magnitudes of the input voltage. In other words, embodiments herein propose a power converter and a corresponding control method where the regulation of the power converter 111-11B is adjusted in such a way that at least in one operation range of input to output voltages the current ripple stays constant or varies with respect to a desired ripple current value. Note that, for the 7-level inverter, this operation point exists for output voltages of 5/6 VDC; 2/3 VDC; 1/2 VDC; 1/3 VDC and 1/6 VDC with VDC being the input voltage.

FIG. 12 is an example block diagram of a computer system for implementing any of the operations as previously discussed according to embodiments herein.

Any of the resources (such as controller 140, switching frequency selector 141, etc.) as discussed herein can be configured to include computer processor hardware and/or corresponding executable instructions to carry out the different operations as discussed herein.

As shown, computer system 1250 of the present example includes an interconnect 1211 that couples computer readable storage media 1212 such as a non-transitory type of media (which can be any suitable type of hardware storage medium in which digital information can be stored and retrieved), a processor 1213 (computer processor hardware), I/O interface 1214, and a communications interface 1217.

I/O interface(s) 1214 supports connectivity to power converter 111.

Computer readable storage medium 1212 can be any hardware storage device such as memory, optical storage, hard drive, floppy disk, etc. In one embodiment, the computer readable storage medium 1212 stores instructions and/or data.

As shown, computer readable storage media 1212 can be encoded with controller application 140-1 (e.g., including instructions) to carry out any of the operations as discussed herein.

During operation of one embodiment, processor 1213 accesses computer readable storage media 1212 via the use of interconnect 1211 in order to launch, run, execute, interpret or otherwise perform the instructions in controller application 140-1 stored on computer readable storage medium 1212. Execution of the controller application 140-1 produces controller process 140-2 to carry out any of the operations and/or processes as discussed herein.

Those skilled in the art will understand that the computer system 1250 can include other processes and/or software and hardware components, such as an operating system that controls allocation and use of hardware resources to execute controller application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1450 may reside at any location or can be included in any suitable resource in any network environment to implement functionality as discussed herein.

Functionality supported by the different resources will now be discussed via flowchart in FIG. 13. Note that the steps in the flowcharts below can be executed in any suitable order.

Figure 13:
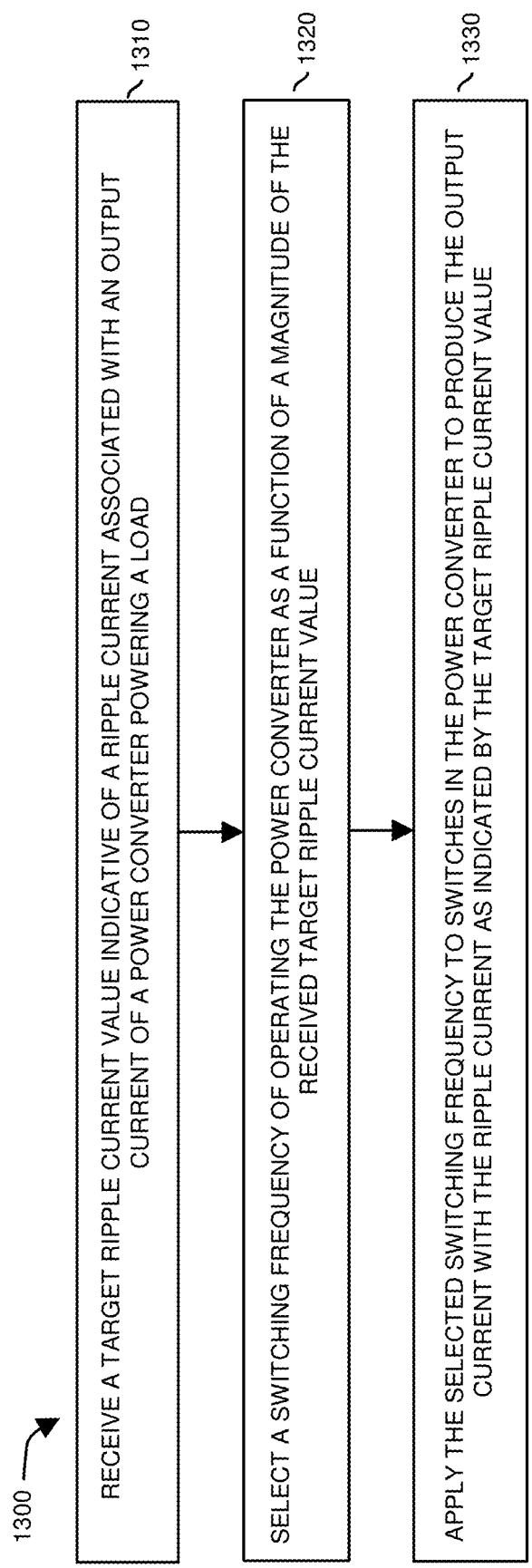
FIG. 13 is an example diagram illustrating a general method according to embodiments herein.

FIG. 13 is a flowchart 1300 illustrating an example method according to embodiments herein. Note that there will be some overlap with respect to concepts as discussed above.

In processing operation 1310, the controller 140 receives a target ripple current value indicative of a ripple current associated with an output current 122 of a power converter 111 powering a load 118.

In processing operation 1320, the switching frequency selector of the controller 140 selects a switching frequency SF of operating the power converter 121 as a function of a magnitude of the received target ripple current value TRCV.

In processing operation 1330, the controller applies the selected switching frequency SF to switches Qx in the power converter 121 to produce the output current 122 with the ripple current as indicated by the target ripple current value TRCV.

Figure 14:
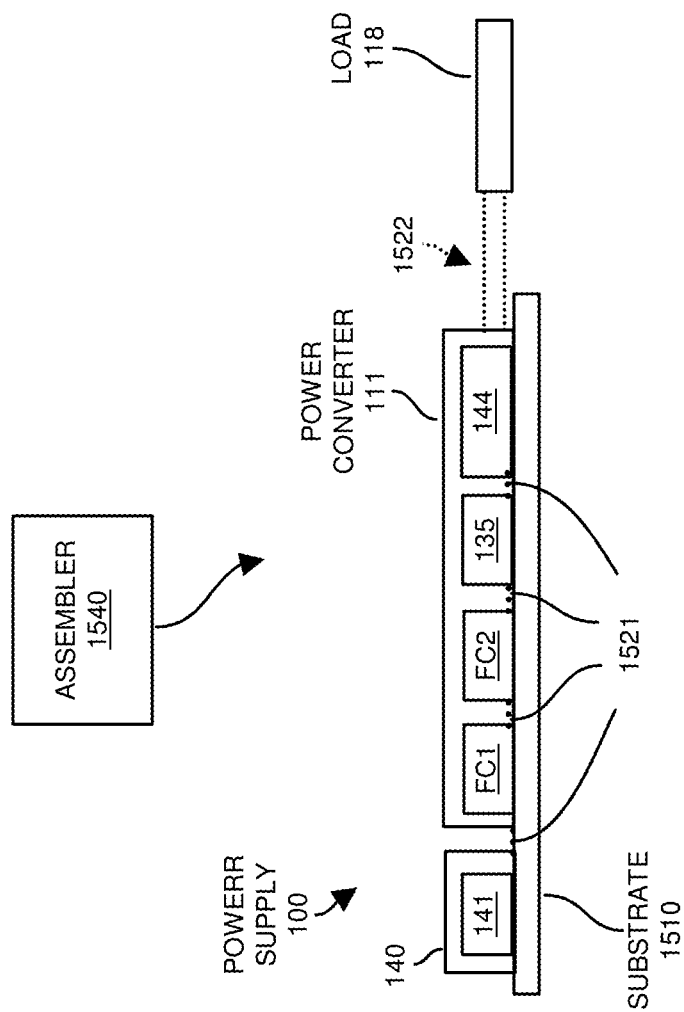
FIG. 14 is an example diagram illustrating fabrication of a multi-level power converter (such as a regulated voltage converter) on a circuit board according to embodiments herein.

FIG. 14 is an example diagram illustrating fabrication of a power converter circuit on a circuit board according to embodiments herein.

In this example embodiment, fabricator 1540 receives a substrate 1510 (such as a circuit board).

The fabricator 1540 affixes the power supply 100 (and corresponding components such as controller 140, switching frequency selector 141, power converter 111, one or more flying capacitors, switches 125, power converter 111, etc., as previously discussed) to the substrate 1510. One or more circuit paths 1521 provide connectivity amongst the different components as discussed herein. Via circuit paths 1522 (such as one or more traces, cables, wires, etc.), the fabricator 1540 couples the power supply 100 to load 118. In one embodiment, the circuit paths 1522 convey the output voltage 123 and corresponding generated output current 122 to the load 118.

Accordingly, embodiments herein include a system comprising: a substrate 1510 (such as a circuit board, standalone board, mother board, standalone board destined to be coupled to a mother board, etc.); a power supply 100 including corresponding components (such as controller 140, power converter 111, and corresponding components) as described herein; and a load 118. As previously discussed, the load 118 is powered based on conveyance of output voltage 123 and corresponding output current 122 over one or more circuit paths 1522 from the power supply 100 to the load 118.

Note that further embodiments herein include a system (as shown in FIG. 15) comprising: the circuit substrate 1510 and the load 118 disposed on the substrate 1510 or remotely located with respect to the substrate 1510. The power supply 100 (apparatus) and corresponding components are affixed directly to the circuit substrate 1510 or sockets or sub-assemblies (such as sockets, etc.) of the substrate 1510. The power supply 100 powers the load 118 via the output voltage 123 (such as via one or more circuit paths 1522).

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1510 or disposed at a remote location.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a controller operative to:
receive a target ripple current value indicative of a ripple current associated with an output current of a power converter powering a load;
select a switching frequency of operating the power converter as a function of a magnitude of the received target ripple current value;
apply the selected switching frequency to switches in the power converter to produce the output current with a magnitude of ripple current as indicated by the target ripple current value; and
wherein the controller is operative to regulate a magnitude of an AC component of the output current with respect to the target ripple current value based on adjusting a magnitude of the switching frequency controlling the switches in the power converter.

2. The apparatus as in claim 1, wherein the power converter is operative to produce the output current based on an input voltage;
wherein the target ripple current value is a constant ripple current value for different magnitudes of the input voltage; and
wherein the controller is operative to vary the magnitude of the switching frequency applied to the switches such that the ripple current associated with the output current of the power converter is equal to the constant ripple current value for the different magnitudes of the input voltage.

3. The apparatus as in claim 1, wherein the magnitude of the target ripple current value varies based at least in part on a magnitude of an input voltage converted by the power converter into the output current.

4. The apparatus as in claim 1, wherein the controller is operative to derive the selected switching frequency based on the target ripple current value and a magnitude of an input voltage converted by the power converter into the output current.

5. The apparatus as in claim 1, wherein the output current includes a DC current component and the AC component, the AC component being an AC peak-to-peak current component, the ripple current being the AC peak-to-peak current component; and
wherein a magnitude of the AC peak-to-peak current component is less than 50% of a magnitude of the DC current component.

6. The apparatus as in claim 1, wherein the controller is further operative to select the switching frequency of operating the power converter to produce the output current based on the magnitude of the received target ripple current value and an inductance of the power converter.

7. The apparatus as in claim 1, wherein the magnitude of the received target ripple current value is selected based at least in part to reduce switching losses associated with the power converter.

8. The apparatus as in claim 1, wherein the power converter is operative to convert an input voltage into the output current; and
wherein the controller is further operative to prevent the switching frequency from dropping below a threshold level while generating the output current over a range of different magnitudes of the input voltage.

9. The apparatus as in claim 1, wherein the power converter is a multi-level buck converter having more than 2 levels.

10. The apparatus as in claim 1, wherein the power converter is operative to convert an input voltage into the output current;
wherein the controller is operative to operate the power converter in a first mode during conditions in which a magnitude of the input voltage is above a threshold level, the first mode operative to switch between a first voltage level and a second voltage level to produce the output current; and
wherein the controller is operative to operate the power converter in a second mode during conditions in which the magnitude of the input voltage is below the threshold level, the first mode operative to switch between the second voltage level and a third voltage level to produce the output current.

11. The apparatus as in claim 1, wherein the controller is further operative to:
produce a first modulation index value, m_real, based on: i) a magnitude of an output voltage produced by the power converter, the output voltage supplying the output current, and ii) a magnitude of an input voltage converted by the power converter into the output current; and
derive the switching frequency based on the first modulation index value.

12. The apparatus as in claim 11, wherein the first modulation index value, m_real, equals Vout/Vin, where Vout is the magnitude of the output voltage of the power converter supplying the output current to the load, where Vin is a magnitude of the input voltage;
wherein the controller is further operative to produce a second modulation index value, m_eff, equal to m_real×MODULO×(1/N_cells), where N_cells=n_levels−1, where n_levels equals a number of different voltages supported by the power converter to produce the output voltage;
wherein the switching frequency is f_sw; and
wherein:

$$f\_sw = V\text{in}/(\Delta i \cdot L) \cdot m\_\mathit{eff} \cdot (1/N\_\text{cells} - m\_\mathit{eff}),$$

where Δi=the target ripple current value, and
where L=a magnitude of an inductance implemented in the power converter to convert the input voltage into the output current.

13. A system comprising:
a circuit substrate; and
wherein the apparatus of claim 1 is affixed to the circuit substrate and powers the load via the output current.

14. A method comprising:
receiving a circuit substrate; and
fabricating the apparatus of claim 1 on the circuit substrate.

15. The apparatus as in claim 1, wherein the power converter is operative to convert an input voltage into the output current; and wherein the controller is operative to decrease the magnitude of the switching frequency in response to a condition in which a magnitude of the input voltage decreases.

16. The apparatus as in claim 1, wherein the power converter is operative to convert an input voltage into the output current; and
wherein the controller is operative to increase the magnitude of the switching frequency in response to a condition in which a magnitude of the input voltage decreases.

17. The apparatus as in claim 1, wherein the controller is further operative to produce an output voltage, the output voltage supplying the output current to the load; and
wherein the controller is operative to regulate a magnitude of the output voltage with respect to a setpoint reference voltage.

18. The apparatus as in claim 1, wherein the power converter is operative to produce the output current based on an input voltage; and
wherein the magnitude of the target ripple current value is varied within an envelope for different magnitudes of the input voltage.

19. The apparatus as in claim 18, wherein the envelope includes an inflection point about which: i) the magnitude of the target ripple voltage increases for increasing magnitudes of the input voltage with respect to the inflection point, and ii) the magnitude of the target ripple voltage increases for decreasing magnitudes of the input voltage with respect to the inflection point.

20. A method comprising:
receiving a target ripple current value indicative of a ripple current associated with an output current of a power converter powering a load;
select a switching frequency of operating the power converter as a function of a magnitude of the received target ripple current value; and
apply the selected switching frequency to switches in the power converter to produce the output current with the ripple current as indicated by the target ripple current value;
the method further comprising:
producing a first modulation index value, m_real, based on: i) a magnitude of an output voltage produced by the power converter, the output voltage supplying the output current, and ii) a magnitude of an input voltage converted by the power converter into the output current;
deriving the switching frequency based on the first modulation index value;
wherein the first modulation index value, m_real, equals Vout/Vin, where Vout is the magnitude of the output voltage of the power converter supplying the output current to the load, where Vin is the magnitude of the input voltage;
the method further comprising:
producing a second modulation index value, m_eff, equal to m_real MODULO (1/N_cells), where N_cells=n_levels−1, where n_levels equals a number of different voltages supported by the power converter to produce the output voltage;
wherein the switching frequency is f_sw; and
wherein:

$$f\_sw = Vin/(\Delta i \cdot L) \cdot m\_eff \cdot (1/N\_cells - m\_eff),$$

where Δi=the target ripple current value, and
where L=a magnitude of an inductance implemented in the power converter to convert the input voltage into the output current.

21. The method as in claim 20 further comprising:
produce the output current based on the input voltage, the target ripple current value being a constant ripple current value for different magnitudes of the input voltage; and
varying a magnitude of the switching frequency applied to the switches such that the ripple current associated with the output current of the power converter is equal to the constant ripple current value for the different magnitudes of the input voltage.

22. The method as in claim 20, wherein the magnitude of the target ripple current value varies based at least in part on a magnitude of the input voltage converted by the power converter into the output current.

23. The method as in claim 20 further comprising:
deriving the selected switching frequency based on the target ripple current value and the magnitude of the input voltage converted by the power converter into the output current.

24. The method as in claim 20, wherein the output current includes a DC current component and an AC peak-to-peak current component, the ripple current being the AC peak-to-peak current component; and
wherein a magnitude of the AC peak-to-peak current component is less than 50% of a magnitude of the DC current component.

25. The method as in claim 20 further comprising:
selecting the switching frequency of operating the power converter to produce the output current based on the magnitude of the received target ripple current value and the inductance of the power converter.

26. The method as in claim 20 further comprising:
selecting the magnitude of the target ripple current value based at least in part to reduce switching losses associated with the power converter.

27. The method as in claim 20 further comprising:
controlling the power converter to convert the input voltage into the output current; and
preventing the switching frequency from dropping below a threshold level while generating the output current over a range of different magnitudes of the input voltage.

28. The method as in claim 20, wherein the power converter is a multi-level buck converter having more than 2 levels.

29. The method as in claim 20 further comprising:
controlling the power converter to convert the input voltage into the output current; and
controlling the power converter to operate in a first mode during conditions in which a magnitude of the input voltage is above a threshold level, the first mode operative to switch between a first voltage level and a second voltage level to produce the output current; and
controlling the power converter to operate in a second mode during conditions in which the magnitude of the input voltage is below the threshold level, the first mode operative to switch between the second voltage level and a third voltage level to produce the output current.

30. An apparatus comprising:
a controller operative to:
- receive a target ripple current value indicative of a ripple current associated with an output current of a power converter powering a load;
- select a switching frequency of operating the power converter as a function of a magnitude of the received target ripple current value;
- apply the selected switching frequency to multiple switches in the power converter to produce the output current with a magnitude of ripple current as indicated by the target ripple current value;

wherein the multiple switches include a first switch and a second switch disposed in series;
wherein the power converter includes:
- an inductor directly coupled to a first node, the first node connecting the first switch and the second switch in series; and
- a flying capacitor disposed in parallel with a series circuit path including the first switch and the second switch.

31. The apparatus as in claim 30, wherein the multiple switches further include a third switch and a fourth switch disposed in series with the first switch and the second switch; and
- wherein the third switch provides connectivity between a voltage source and the first switch; and
- wherein the fourth switch provides connectivity between the second switch and a reference potential associated with voltage source.

* * * * *